(12) United States Patent
Robillard et al.

(10) Patent No.: US 6,253,178 B1
(45) Date of Patent: Jun. 26, 2001

(54) SEARCH AND RESCORING METHOD FOR A SPEECH RECOGNITION SYSTEM

(75) Inventors: Serge Robillard, Lachine; Nadia Girolamo, St-Bruno; Andre Gillet, St-Laurent; Waleed Fakhr, Verdun, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/934,736

(22) Filed: Sep. 22, 1997

(51) Int. Cl.$^7$ .............................. G10L 15/08; G10L 15/14
(52) U.S. Cl. ............................. 704/238; 704/256
(58) Field of Search ................... 704/231, 236, 704/238, 242, 251, 255, 256, 241, 252, 254

(56) References Cited

U.S. PATENT DOCUMENTS

| | | | |
|---|---|---|---|
| 4,587,670 | 5/1986 | Levinson et al. | 704/256 |
| 5,195,167 | 3/1993 | Bahl et al. | 704/254 |
| 5,241,619 | * 8/1993 | Schwartz et al. | 704/200 |
| 5,337,394 | * 8/1994 | Sejnoha | 704/241 |
| 5,386,492 | * 1/1995 | Wilson et al. | 704/252 |
| 5,515,475 | 5/1996 | Gupta et al. | 704/255 |
| 5,799,277 | * 8/1998 | Takami | 704/256 |
| 5,884,259 | * 3/1999 | Bahl et al. | 704/252 |

OTHER PUBLICATIONS

X.D.Huang "Phoneme classification using semicontinuous hidden Markov models," IEEE Transactions on Signal Processing, vol. 40, Issue 5, May 1992, pp. 1062–1067.*

Y. Zhao, "A speaker–independent continuous speech recognition system using continuous mixture Gaussian density HMM of phoneme–sized units," IEEE Transactions on Speech and Audio, vol.1, Issue 3, Jul. 1993, pp. 345–361.*

P. Kenny et al., A * Admissible Heuristics for Rapid Lexical Access, Proceeding ICASSP, p. 689–92 (1991).

H. Ney et al., "Data Driven Organization of the Dynamic Programming Beam Search for Continuous Speech Recognition, "IEEE Transactions of Signal Processing, vol. SP–40, No. 2, p. 272–81, Feb. 1992.

R. Schwartz et al., "The N–Best Algorithm: An Efficient and Exact Procedure for Finding the N Most Likely Sentence Hypothesis, "IEEE ICASSP–90, p. 81–84, Albuquerque, Apr. 1990.

V. Steinbiss, "Sentence–Hypothesis Generation in a Continuous Speech Recognition System, "Proc. Euro-Speech–89, vol. 2, p. 51–54, Paris, Sep. 1989.

L. Nguyen et al., "Search Algorithm for Software–Only Real–Time Recognition with Very Large Vocabularies, "Proceedings of ARPA Human Language Technology Workshop, p. 91–95, Plainsboro, New Jersey, Mar. 1993.

* cited by examiner

Primary Examiner—William R. Korzuch
Assistant Examiner—Martin Lerner
(74) Attorney, Agent, or Firm—Finnegan, Henderson, Farabow, Garrett & Dunner, L.L.P.

(57) ABSTRACT

Speech recognition systems and methods consistent with the present invention process input speech signals organized into a series of frames. The input speech signal is decimated to select K frames out of every L frames of the input speech signal according to a decimation rate K/L. A first set of model distances is then calculated for each of the K selected frames of the input speech signal, and a Hidden Markov Model (HMM) topology of a first set of models is reduced according to the decimation rate K/L. The system then selects a reduced set of model distances from the computed first set of model distances according to the reduced HMM topology and selects a first plurality of candidate choices for recognition according to the reduced set of model distances. A second set of model distances is computed, using a second set of models, for a second plurality of candidate choices, wherein the second plurality of candidate choices correspond to at least a subset of the first plurality of candidate choices. The second plurality of candidate choices are rescored using the second set of model distances, and a recognition result is selected from the second plurality of candidate choices according to the rescored second plurality of candidate choices.

25 Claims, 5 Drawing Sheets

SEARCH AND RESCORING METHOD FOR A SPEECH RECOGNITION SYSTEM

BACKGROUND OF THE INVENTION

A. Field of the Invention

The present invention relates to a speech recognition system and method. More particularly, the present invention relates to a speech recognition system that uses a search and rescoring method to recognize the speech.

B. Description of the Related Art

Speech recognition systems typically use a concatenation of phonemes to model the vocabulary of words spoken by a user. Phonemes are the basic units representing the sounds that comprise any given word and, therefore, depend upon the context in which they arise in a word. Allophones are context dependent phonemes and are often represented by Hidden Markov Models (HMM) comprising a sequence of states each having a transition probability. Thus, any word can be represented as a chain of concatenated HMM enabling speech to be modelled as a random walk through the HMM for a word.

To recognize an unknown utterance spoken by the user, the system must then compute the most likely sequence of states through the HMM. The well-known Viterbi method can be used to evaluate the most likely path by opening the HMM up into a trellis. The trellis has the same number of states as there are in the allophone model, and, thus, the total number of operations per frame for each trellis is proportional to the total number of transitions in the corresponding allophone model.

The Viterbi method, however, has two main problems. First, the method is computationally complex because it evaluates every transition at every node of the entire vocabulary network. For speech recognition systems having a medium to large vocabulary, this computation can be very burdensome and greatly increases the cost of the computer hardware. Second, the complexity of the Viterbi method allows the computation for only a single recognition result. This precludes the use of more accurate post processing to refine the recognition result.

While other approaches have been developed which provide more than one choice for the recognition result, they have problems as well. For example, the stack decoding disclosed by P. Kenny et al., "A* Admissible Heuristics for Rapid Lexical Access," Proceeding ICASSP, p. 689–92 (1991), provides alternative choices, but is ineffective when the heuristic partial path likelihoods are inaccurate. The approach disclosed by H. Ney et al., "Data Driven Organization of the Dynamic Programming Beam Search for Continuous Speech Recognition," IEEE Transactions on Signal Processing," Vol. SP-40, No. 2, p. 272–81, February 1992, provides an efficient method to limit the search space. However, this method suffers when the speech contains noise common in telephone applications.

Also known are methods which can be used for continuous word recognition. See R. Schwarthz et al., "The N-Best Algorithm: An Efficient and Exact Procedure for FICES Finding the N Most Likely Sentence Hypothesis," IEEE ICASSP-90, p. 81–84, Albuquerque, April 1990; V. Steinbiss, "Sentence-Hypothesis Generation in a Continuous-Speech Recognition System," Proc. EuroSpeech-89, Vol. 2, p. 51–54, Paris, September 1989; L. Nguyen et al., "Search Algorithm for Software-Only Real-Time Recognition with Very Large Vocabularies," Proceedings of ARPA Human Language Technology Workshop, p. 91–95, Plainsboro, N.J., March 1993. These methods, however, are not useful in recognizing strings of unrelated words, such as strings describing a location, a company name or person's name.

U.S. Pat. No. 5,195,167 (the '167 patent) describes a fast-match search which reduces the number of computations performed by the Viterbi method. The '1167 patent teaches replacing each HMM transition probability at a certain time with the maximal value over the associated allophone. U.S. Pat. No. 5,515,475 discloses a two-pass search method that builds upon the idea of the '167 patent. The first pass identifies the N most likely candidates for the spoken word, the N most likely hypotheses, using a one-state allophone model having a two frame minimum duration. The second pass then decodes the N hypothesis choices using the Viterbi algorithm. The memory and processing time requirements of this approach, however, are unsatisfactory for some applications. Therefore, there is a demand for a speech recognition system which can operate at a high speed without requiring an excessive amount of memory or a high speed processor.

SUMMARY OF THE INVENTION

Systems and methods consistent with the present invention provide a speech recognition system which can operate at a high speed and does not require a large amount of memory or a high speed processor.

To achieve these and other advantages, a method for recognizing speech consistent with the present invention includes the step of calculating feature parameters for each frame of the input speech signal. The input speech signal is organized into a series of frames and is decimated to select K frames out of every L frames of the input speech signal according to a decimation rate K/L. A first set of model distances is then calculated for each of the K selected frames of the input speech signal, and a Hidden Markov Model (HMM) topology of a first set of models is reduced according to the decimation rate K/L. The system then selects a reduced set of model distances from the computed first set of model distances according to the reduced HMM topology and selects a first plurality of candidate choices for recognition according to the reduced set of model distances. A second set of model distances is computed, using a second set of models, for a second plurality of candidate choices, wherein the second plurality of candidate choices correspond to at least a subset of the first plurality of candidate choices. The second plurality of candidate choices are rescored using the second set of model distances, and a recognition result is selected from the second plurality of candidate choices according to the rescored second plurality of candidate choices.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

A. Overview

Systems and methods consistent with the present invention accurately recognize speech at high speeds while using only a minimum amount of computer resources. The method employs a two-pass search to determine the recognition result. The first pass is a coarse decimated search that produces the top N choices for the recognition result at a high speed. The second pass refines the results of the first pass by rescoring the top N choices using more accurate allophone models than those used during the coarse search. The Viterbi method then produces the recognition result based on the choices produced by the first pass. The combination of the coarse decimated search and the fine rescoring enables smaller computer systems, such as a personal computer, to perform high level speech recognition. In addition, speech recognition performed by larger computer systems is improved and the channel density is doubled.

B. Structure

Figure 1:
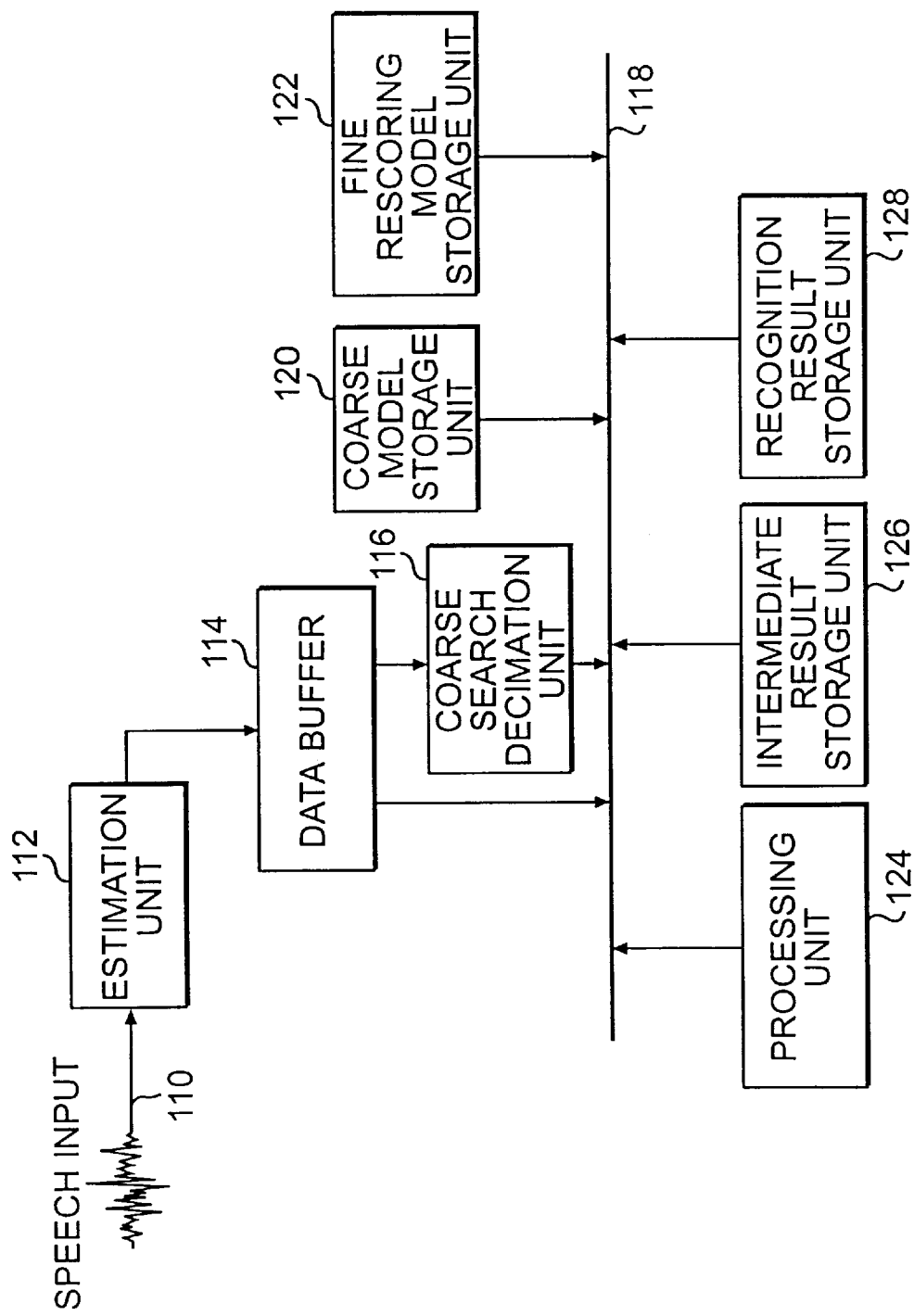
FIG. 1 is a block diagram of a speech recognizer for employing the coarse search and fine rescoring method consistent with the present invention.

FIG. 1 shows a block diagram of a speech recognition system for employing the coarse search and fine rescoring method consistent with the present invention. The speech recognition system may, for example, be a part of an automatic directory assistance system that automatically determines the telephone corresponding to a phrase uttered by a user. As shown in FIG. 1, the speech recognizer includes an input for speech 110 and an estimation unit 112 for determining Cepstrum parameters from the speech signal. The Cepstrum parameters are input to a data buffer 114 connected to a coarse search decimation unit 116 and a bus 118. Also connected to data bus 118 is a coarse model storage unit 120, a fine rescoring model storage unit 122, a processing unit 124, an intermediate result storage unit 126, and a recognition result storage unit 128.

Speech signals 100 are pulse code modulated (PCM) signals organized into a series of frames having framing periods $T_f$ of 12.75 ms. Estimation unit 112 analyzes each PCM frame to calculate Cepstrum parameters for storage in data buffer 114. During the coarse search, decimation unit 116 selects K frames of Cepstrum data for every L frames received, and outputs the K decimated frames to processing unit 124 for distance calculations using the models stored in coarse model storage unit 120. In systems consistent with the present invention, the decimation rate K/L is preferably ⅓, and, therefore, processing unit 124 calculates distances every 38.25 ms ($T_f \times 3$). Processing unit 124 uses these distances to update a trellis stored in intermediate storage unit 126.

The top N choices for the recognition result found by the coarse search, and ranked according to their score, are also stored in intermediate result storage unit 126. From these top N choices, the top M (M≤N) choices having similar scores are selected for the fine rescoring. Processing unit 124 recalculates the distances for each of the cepstral frames of the input speech signal using the models stored in fine rescoring model storage unit 122. Thus, only the top M choices are rescored using the high-level allophone models of fine rescoring model storage unit 122. Processing unit 124 then applies a Viterbi method to produce the recognition result from the top M choices and stores this result in recognition result storage unit 128.

C. Process

Figure 2:
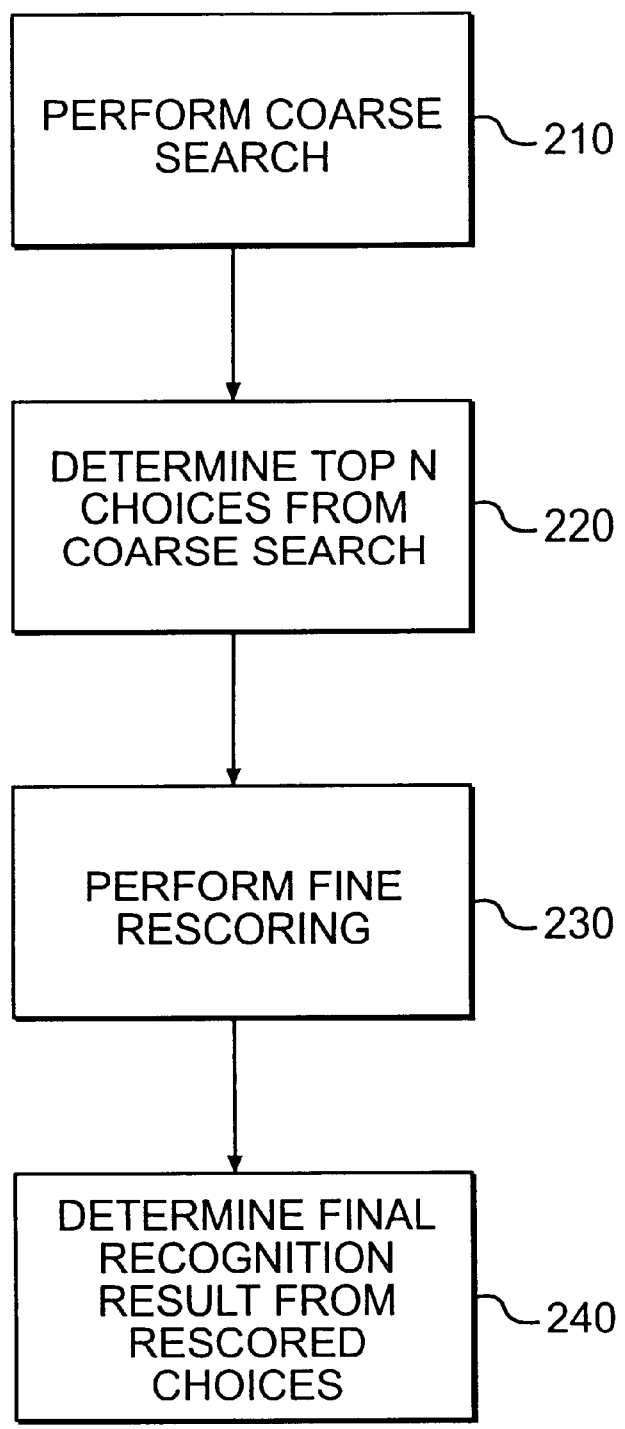
FIG. 2 is a flow diagram of a coarse search and fine rescoring method consistent with the present invention.

FIG. 2 is a flow diagram of a coarse search and fine rescoring method consistent with the present invention. As shown in FIG. 2, the system first performs a coarse decimated search using coarse model storage unit 120 (step 210). This search uses the allophone models stored in coarse model storage unit 120 to produce the top N choices for the recognition result (step 220). Coarse model storage unit preferably has a model set in the range of 250 to 800 allophones. As will be described below, only a fraction of the speech signal's frames are processed during the coarse search. This fraction corresponds to the decimation rate K/L. Depending on the pre-selected decimation rate K/L, the system uses an HMM topology that ensures a high probability that the correct recognition result is included within the top N choices output by the coarse search. In this way, the system can quickly narrow the number of hypothesis choices down to the number N while maintaining a high degree of accuracy.

The second pass refines the results of the first pass by rescoring the top N choices (step 230). The rescoring uses the models of fine rescoring model storage unit 122, having a model set greater than 10,000 allophones. Thus, the allophone models used during the rescoring provide greater resolution (i.e. more precise phonetic context) than the models used during the coarse search. The fine rescoring then applies the Viterbi method using recalculated distances and outputs the recognition result determined to match the input speech (step 240).

1. Coarse Decimated Searching

Figure 3:
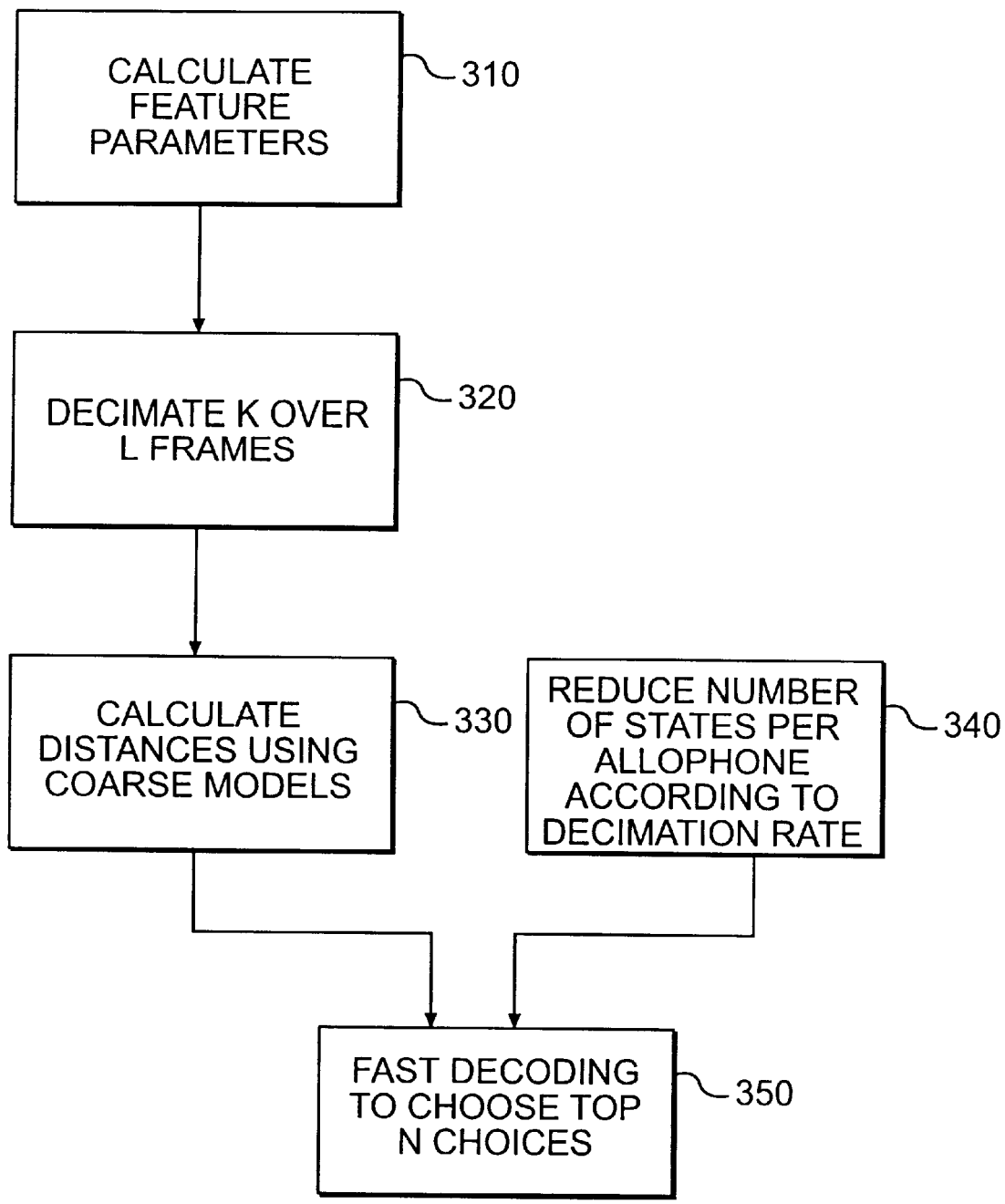
FIG. 3 is a flow diagram of the coarse decimated search method used in systems consistent with the present invention.

FIG. 3 is a flow diagram of the coarse decimated search method used in systems consistent with the present invention. As shown in FIG. 3, estimation unit 112 calculates Cepstrum parameters for each PCM frame of the input speech signal (step 310). To reduce processing time, the Cepstrum framing data is decimated such that only K out of every L frames (K<L) are processed by processing unit 124 (step 320). Processing unit 124 uses the decimated framing data to calculate the Cepstrum model distances using the allophone models stored in coarse model storage unit 120 (step 330). As described above, coarse model storage unit preferably has a model set in the range of 250 to 800 allophones. Using a smaller model set of this size and only K out of the L framing data, reduces the processing time for processing unit 124 to determine the top N choices.

Figure 4:
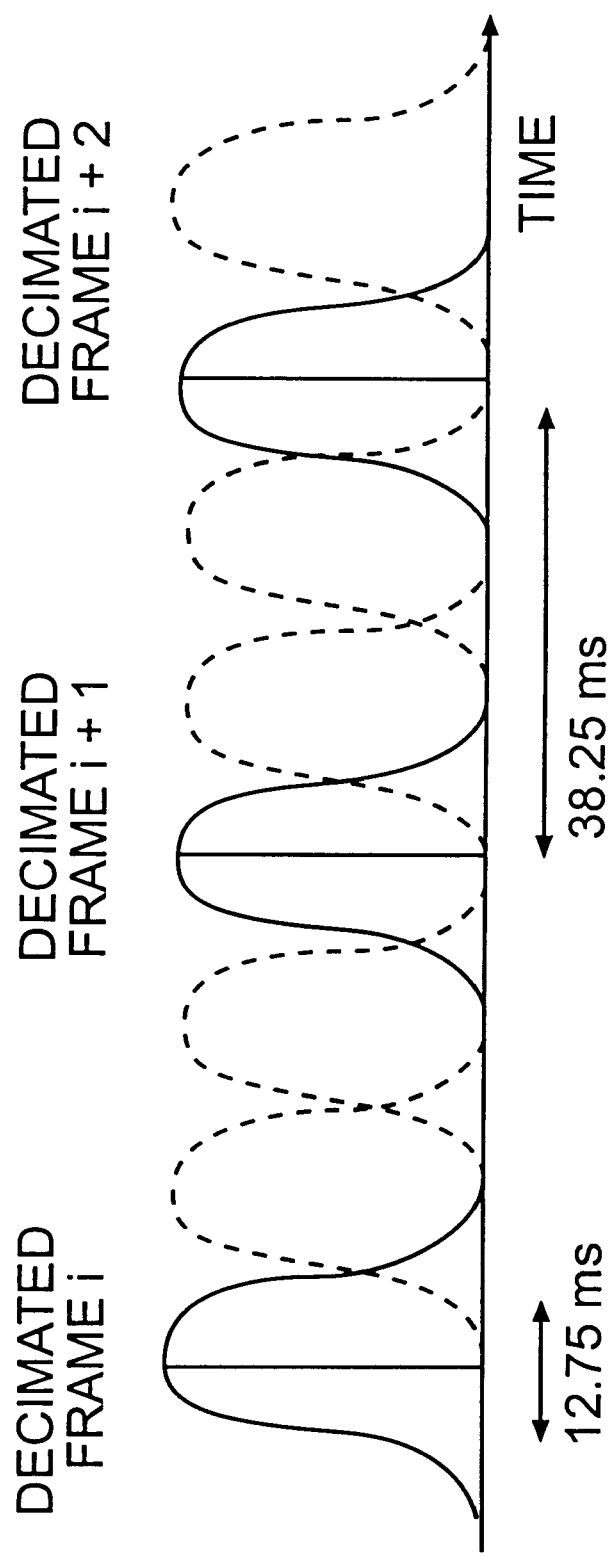
FIG. 4 is a diagram illustrating frame decimation for a rate of ⅓.

FIG. 4 is a diagram illustrating frame decimation for a rate of ⅓. As shown in FIG. 4, one frame out of every three frames is selected for processing. The acoustic frames preferably use a 25.5 ms Hamming window every 12.75 ms such that coarse search decimation unit 116 selects 25.5 ms of speech every 38.25 ms (3×12.75 ms). Systems consistent with the present invention use a decimation rate of ⅓ (K=1, L=3) to provide the greatest savings in computer resources without sacrificing recognition accuracy, but, as described in greater detail below, one of ordinary skill will recognize that other decimation rates may also be used.

For the decimation rate K/L applied by coarse search decimation unit 116, processing unit 124 determines the number of HMM states that allows the HMM topology to maintain the phoneme minimum duration in a range that reduces phoneme insertion without overly constraining the decoding process (step 340). Alternatively, the number of HMM states for each decimation rate K/L can be pre-set by storing models having the reduced number of states in coarse model storage unit 120. The phoneme minimum duration is preferably between 25–40 ms and, in particular, has a value equal to 38.25 ms, with the number of HMM states being one.

Processing unit 124 selects the number of HMM states $N_{states}$ that will preserve the phoneme minimum duration property $D_{PhoneMinimum}$, given the duration of each frame $T_f$. In systems consistent with the present invention, $N_{states}$ is calculated by solving the following two equations:

$$N'_{states} = \mathrm{argmin}\left|\frac{N_{states}T_f L}{K} - D_{PhoneMinimum}\right| \quad \text{Eq. 1}$$

$$\left|\frac{N'_{states}T_f L}{K} - D_{PhoneMinimum}\right| \le D_{PhoneMinimumMargin} \quad \text{Eq. 2}$$

where:

| | |
|---|---|
| $\mathrm{argmin}|f(x)|$ | represents the value of $x$ that minimizes the absolute integer value of the function $f(x)$; |
| $T_f$ | is preferably 12.75 ms; |
| $D_{PhoneMinimum}$ | is preferably 35 ms; and |
| $D_{PhoneMinimumMargin}$ | is preferably 8 ms. |

Thus, for decimation rates of K/L=1/1, 3/4, 1/2, and 1/3, the number of HMM states per allophone are N'states=3, 2, 1, and 1. In this way, systems consistent with the invention maintain high recognition accuracy, an attribute which would otherwise be lost as a result of the frame decimation. After reducing the HMM topology in accordance with the decimation employed, the effective phoneme minimum duration $D_{PhoneMinimum}$ should be as close as possible to a pre-determined ideal target value (e.g. 35 ms).

Equation (2) describes that the difference to the target value for the phoneme minimum duration $D_{PhoneMinimum}$ should be within an acceptable phoneme minimum duration margin Returning to FIG. 3, the coarse search then employs a fast decoding to choose the top N choices as candidates for recognition (step 350). This fast decoding is similar to that disclosed in U.S. Pat. No. 5,515,475, the subject matter of which is incorporated by reference. During the fast decoding, processing unit 124 updates the trellis stored in intermediate storage unit 126 using the distances calculated in step 330. Thus, processing unit 124 will only update the trellis during the decimated frames K for which the distances are calculated. However, only the number of distances corresponding to the reduced HMM topology are used to update the trellis. Once processing unit 124 completes the updating of the trellis, processing unit 124 selects the end values having the highest score as the N choices. For large vocabularies of 1,000 to 5,000 words, N is preferably equal to 12.

2. Fine Rescoring

Figure 5:
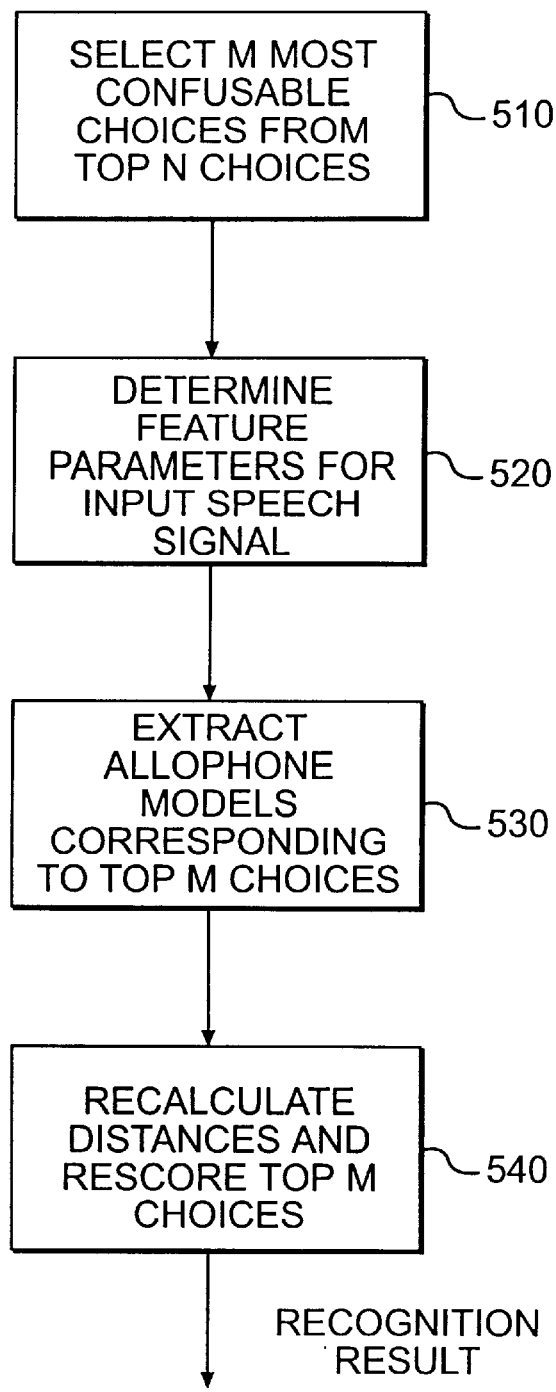
FIG. 5 is a flow diagram of the fine re-scoring search method used in systems consistent with the present invention.

FIG. 5 is a flow diagram of the fine re-scoring search method used in systems consistent with the present invention. As shown in FIG. 5, the system selects the M most confusable choices from the top N choices determined from the coarse searching method (step 510). The M confusable choices are determined by retaining the M choices having a likelihood score that is within a predetermined distance to the best recognition result of the top N choices. For example, the value for M may be chosen using a score ratio feature that describes the ratio formed between the top choice and each of the subsequent choices found by processing unit 124. Choices having a score ratio below a threshold value, preferably 0.2, are chosen as the top M choices.

The system then selects the set of global Cepstrum estimates stored in data buffer 114 to model the acoustic features of input speech signal 110 (step 520). For the rescoring, Cepstrum parameter data for all of the frames of input speech signal 110 are used (i.e. the un-decimated framing data). Next, processing unit 124 extracts from fine rescoring model storage unit 122 the set of allophone models used to represent the top M choices (step 530). As described above, fine rescoring model storage unit 122 includes a large set of allophone models, preferably containing more than 10,000 models and having an HMM topology of 3 states per model. These models more accurately represent the phonetic context of speech than the models used in the coarse search and, thus, yield better recognition accuracy. In addition, since the fine rescoring uses only those models of fine rescoring model storage unit 122 needed to represent the top M choices, the processing time is reduced.

The system then recalculates the acoustic distances and applies the Viterbi method to rescore the M choices, the top rescored choice being chosen as the recognition result (step 540). The acoustic distances are the distance measures between acoustic frames, and are calculated using the means of Gaussian functions. A mixture of the means of Gaussian functions is associated with each state of each allophone model. Recalculating the distances greatly reduces the memory storage requirements by eliminating the need to store the distances determined during the coarse search. The distance recalculation also allows the fine rescoring to use more precise allophones, thereby increasing the recognition accuracy.

D. Conclusion

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A method for recognizing speech of an input speech signal organized into a series of frames, the method comprising the steps of:

calculating feature parameters for each frame of the input speech signal;

decimating the input speech signal to select K frames out of every L frames of the input speech signal according to the decimation rate K/L;

computing a first set of model distances for each of the K selected frames of the input speech signal;

reducing a Hidden Markov Model (HMM) topology of a first set of models according to the decimation rate K/L and a target phoneme duration, such that a resultant phoneme duration of the reduced HMM topology is within a predetermined range of the target phoneme duration, wherein each model of the first set of models represents a phoneme;

determining a reduced set of model distances from the computed first set of model distances according to the reduced HMM topology;

selecting a first plurality of candidate choices for recognition according to the reduced set of model distances;

computing a second set of model distances, using a second set of models, for a second plurality of candidate choices, wherein the second plurality of candidate choices correspond to at least a subset of the first plurality of candidate choices;

rescoring the second plurality of candidate choices using the second set of model distances; and selecting a recognition result from the second plurality of candidate choices according to the rescored second plurality of candidate choices.

2. The method of claim 1, wherein the step of calculating feature parameters includes the substep of:

calculating Cepstrum parameters for each frame of the input speech signal.

3. The method of claim 1, wherein the step of decimating the input speech signal includes the substep of:

decimating the input speech signal according to a decimation rate K/L equal to 1/3.

4. The method of claim 1, wherein the step of reducing the HMM topology includes the substep of:

determining the number of states N'$_{states}$ per model of the first set of models to maintain a phoneme minimum duration by solving the following two equations:

$$N'_{states} = \mathrm{argmin}\left|\frac{N_{states}T_fL}{K} - D_{PhoneMinimum}\right| \quad \mathrm{Eq.\ 1}$$

$$\left|\frac{N'_{states}T_fL}{K} - D_{PhoneMinimum}\right| \le D_{PhoneMinimumMargin} \quad \mathrm{Eq.\ 2}$$

where:

| | |
|---|---|
| $N_{states}$ | represents the original number of states per model of the first set of models; |
| $\mathrm{argmin}\|f(x)\|$ | represents the value of $x$ that minimizes the absolute integer value of the function $f(x)$; |
| $T_f$ | represents a period of a frame of the input speech signal; |
| $D_{PhoneMinimum}$ | represents the phoneme minimum duration; and |
| $D_{PhoneMinimumMargin}$ | represents a phoneme minimum duration error margin. |

5. The method of claim 4, wherein the following values are used for the two equations:

$T_f$=12.75 ms;

$D_{PhoneMinimum}$=35 ms; and $D_{PhoneMinimumMargin}$=8 ms.

6. The method of claim 1, wherein the step of reducing the HMM topology includes the substep of:

reducing a Hidden Markov Model (HMM) topology of a first set of models having a lower speech recognition resolution than the second set of models.

7. The method of claim 1, wherein the step of selecting the first plurality of candidate choices includes the substeps of:

generating a trellis for determining a likelihood that a sequence of models of the first set of models represents a word;

updating the trellis for each decimated frame K of the input speech signal using the reduced set of model distances; and selecting N candidate choices according to likelihood scores determined by the trellis and wherein the N candidate choices have the N highest likelihood scores.

8. The method of claim 1, further including the step of:

selecting the second plurality of candidate choices from the first plurality of candidate choices.

9. The method of claim 8, wherein the step of selecting the second plurality of candidate choices includes the substep of:

selecting, as the second plurality of candidate choices, candidate choices having a likelihood score within a predetermined distance to the choice of the first plurality candidate choices having the highest likelihood score.

10. The method of claim 1, wherein the step of computing a second set of model distances includes the substep of:

computing the second set of model distances for each of the frames of the input speech signal.

11. The method of claim 1, wherein the step of computing a second set of model distances includes the substep of:

computing the second set of model distances using only models of the second set of models which correspond to the second plurality of candidate choices.

12. The method of claim 1, wherein the step of reducing the HMM topology includes the substep of:

determining the number of states N'$_{states}$ per model of the first set of models to maintain a phoneme minimum duration based on the decimation rate K/L and the phoneme minimum duration.

13. A system for recognizing speech of an input speech signal organized into a series of frames, the system comprising:

means for calculating feature parameters for each frame of the input speech signal;

means for decimating the input speech signal to select K frames out of every L frames of the input speech signal according to the decimation rate K/L;

means for computing a first set of model distances for each of the K selected frames of the input speech signal;

means for reducing a Hidden Markov Model (HMM) topology of a first set of models according to the decimation rate K/L and a target phoneme duration, such that a resultant phoneme duration of the reduced HMM topology is within a predetermined range of the target phoneme duration, wherein each model of the first set of models represents a phoneme;

means for determining a reduced set of model distances from the computed first set of model distances according to the reduced HMM topology;

means for selecting a first plurality of candidate choices for recognition according to the reduced set of model distances;

means for storing a second set of models;

means for computing a second set of model distances, using the second set of models, for a second plurality of candidate choices, wherein the second plurality of candidate choices correspond to at least a subset of the first plurality of candidate choices;

means for rescoring the second plurality of candidate choices using the second set of model distances; and means for selecting a recognition result from the second plurality of candidate choices according to the rescored second plurality of candidate choices.

14. The system of claim 13, wherein the means for calculating feature parameters includes:

means for calculating Cepstrum parameters for each frame of the input speech signal.

15. The system of claim 13, wherein the means for decimating the input speech signal includes:
   means for decimating the input speech signal according to a decimation rate K/L equal to ⅓.

16. The system of claim 13, wherein the means for reducing the HMM topology further includes:
   means for determining the number of states N'$_{states}$ per model of the first set of models to maintain a phoneme minimum duration by solving the following two equations:

$$N'_{states} = \mathrm{argmin} \left| \frac{N_{states} T_f L}{K} - D_{PhoneMinimum} \right| \quad \text{Eq. 1}$$

$$\left| \frac{N'_{states} T_f L}{K} - D_{PhoneMinimum} \right| \leq D_{PhoneMinimumMargin} \quad \text{Eq. 2}$$

where:

$N_{states}$     represents the original number of states per model of the first set of models;

$\mathrm{argmin}|f(x)|$     represents the value of $x$ that minimizes the absolute integer value of the function $f(x)$;

$T_f$     represents a period of a frame of the input speech signal;

$D_{PhoneMinimum}$     represents the phoneme minimum duration; and $D_{PhoneMinimumMargin}$     represents a phoneme minimum duration error margin.

17. The system of claim 16, wherein the following values are used for the two equations:

$T_f$=12.75 ms;

$D_{PhoneMinimum}$=35 ms; and $D_{PhoneMinimumMargin}$=8 ms.

18. The system of claim 13, wherein the first set of models have a lower speech recognition resolution than the second set of models.

19. The system of claims wherein the means for selecting the first plurality of candidate choices includes:
   means for generating a trellis for determining a likelihood that a sequence of models of the first set of models represents a word;
   means for updating the trellis for each decimated frame K of the input speech signal using the reduced set of model distances; and
   means for selecting N candidate choices according to likelihood scores determined by the trellis and wherein the N candidate choices have the N highest likelihood scores.

20. The system of claim 13, further including:
   means for selecting the second plurality of candidate choices from the first plurality of candidate choices.

21. The system of claim 20, wherein the means for selecting the second plurality of candidate choices includes:
   means for selecting, as the second plurality of candidate choices, candidate choices having a likelihood score within a predetermined distance to the choice of the first plurality candidate choices having the highest likelihood score.

22. The system of claim 13, wherein the means for computing a second set of model distances includes:
   means for computing the second set of model distances for each of the frames of the input speech signal.

23. The system of claim 13, wherein the means for computing a second set of model distances includes:
   means for computing the second set of model distances using only models of the second set of models which correspond to the second plurality of candidate choices.

24. The system of claim 13, wherein the system for recognizing speech is part of an automatic directory assistance system.

25. The system of claim 13, wherein the means for reducing the HMM topology further includes:
   means for determining the number of states N'$_{states}$ per model of the first set of models to maintain a phoneme minimum duration based on the decimation rate K/L and the phoneme minimum duration.

* * * * *

UNITED STATES PATENT AND TRADEMARK OFFICE
CERTIFICATE OF CORRECTION

PATENT NO. : 6,253,178 B1
DATED : June 26, 2001
INVENTOR(S) : Serge Robillard et al.

It is certified that error appears in the above-identified patent and that said Letters Patent is hereby corrected as shown below:

Column 7, claim 4,
Line 21, change "argmin" to -- arg min --; and
Line 31, change "argmin" to -- arg min --;

Column 9, claim 15,
Line 12, change "argmin" to -- arg min --.

Signed and Sealed this

Fifteenth Day of January, 2002

JAMES E. ROGAN
*Director of the United States Patent and Trademark Office*

*Attest:*

*Attesting Officer*